(12) United States Patent  
Bokelman et al.

(10) Patent No.: US 7,944,591 B2  
(45) Date of Patent: May 17, 2011

(54) MEDIA INTERACTION DEVICE DRIVE SYSTEM

(75) Inventors: Kevin L. Bokelman, San Diego, CA (US); Glenn W. Gaarder, San Diego, CA (US); Ryan M. Smith, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1141 days.

(21) Appl. No.: 11/669,141

(22) Filed: Jan. 30, 2007

(65) Prior Publication Data

US 2008/0180755 A1     Jul. 31, 2008

(51) Int. Cl.  
*H04N 1/04* (2006.01)  
*G03G 15/00* (2006.01)  
*B41F 31/00* (2006.01)

(52) U.S. Cl. .... 358/497; 399/211; 399/212; 101/352.08

(58) Field of Classification Search .................. 358/474, 358/497, 471, 494, 476, 496; 399/211, 212; 101/352.08  
See application file for complete search history.

(56) References Cited

U.S. PATENT DOCUMENTS

| | | | |
|---|---|---|---|
| 5,857,133 A | 1/1999 | Sun | |
| 5,907,413 A | 5/1999 | Han | |
| 6,108,108 A | 8/2000 | Peng | |
| 6,285,441 B1 | 9/2001 | Takahara | |
| 6,426,823 B1 | 7/2002 | Hsiao et al. | |
| 6,626,360 B2 | 9/2003 | Huang | |
| 6,631,014 B1 | 10/2003 | Aoshima et al. | |
| 6,952,292 B2 | 10/2005 | Takeuci et al. | |
| 2004/0160652 A1* | 8/2004 | Kimura et al. | 358/514 |

* cited by examiner

*Primary Examiner* — Benny Q Tieu  
*Assistant Examiner* — Sunil Chacko

(57) ABSTRACT

Various methods and apparatus relating to a media interaction device drive system having at least one reduced dimension are disclosed.

20 Claims, 4 Drawing Sheets

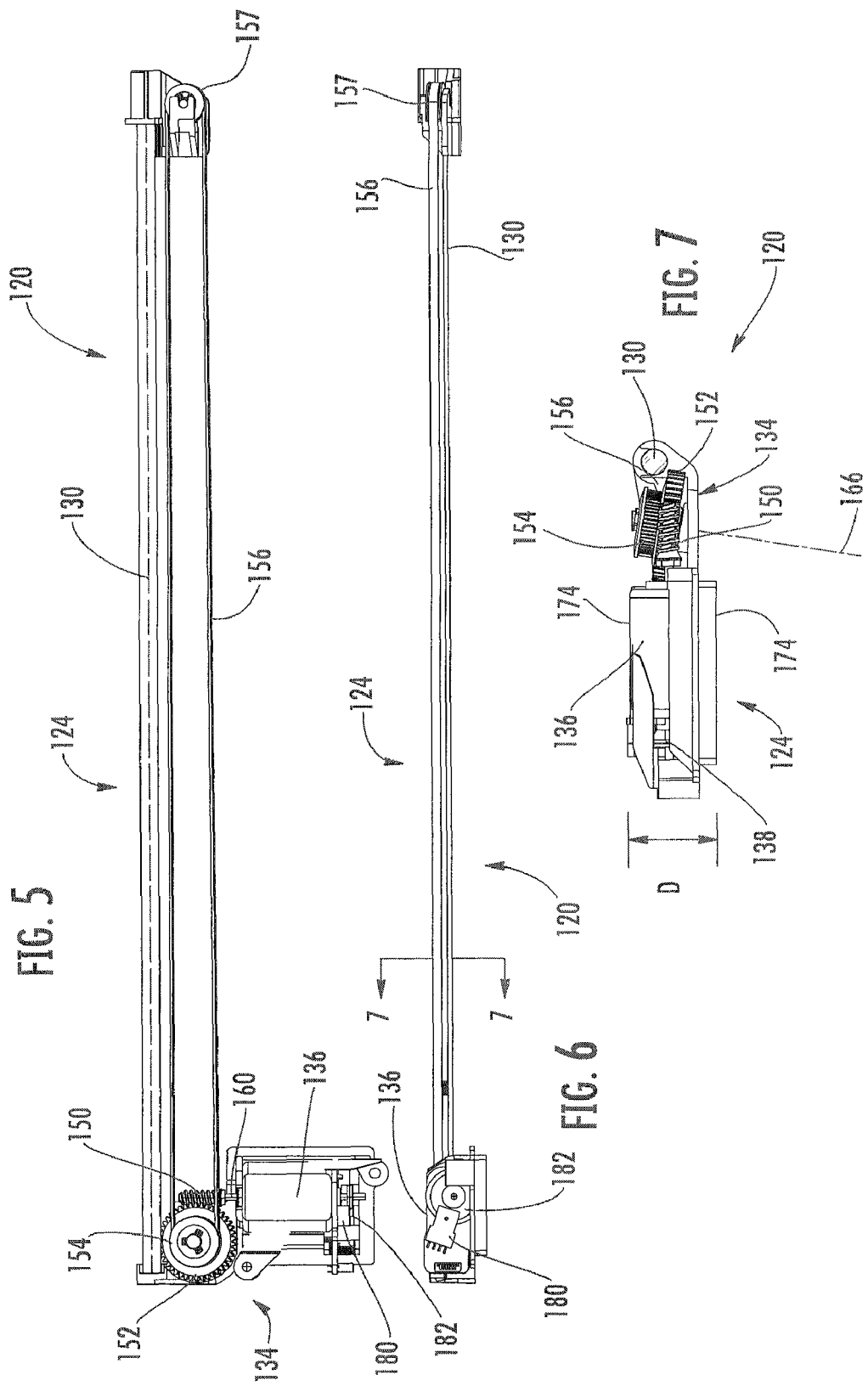

MEDIA INTERACTION DEVICE DRIVE SYSTEM

BACKGROUND

Some media interaction systems, such as printers and scanners, may move a media interaction device across a medium being interacted upon. Drive systems used to move the media interaction device may reduce performance of the system or may increase the size of the system.

BRIEF DESCRIPTION OF THE DRAWINGS

FIG. 5 is a top plan view of the media interaction device drive system of FIG. 4 according to an example embodiment.

FIG. 6 is a side elevational view of the media interaction device drive system of FIG. 4 according to an example embodiment.

FIG. 7 is a sectional view of the media interaction device drive system of FIG. 6 taken along line 7-7 according to an example embodiment.

DETAILED DESCRIPTION OF THE EXAMPLE EMBODIMENTS

Figure 1:
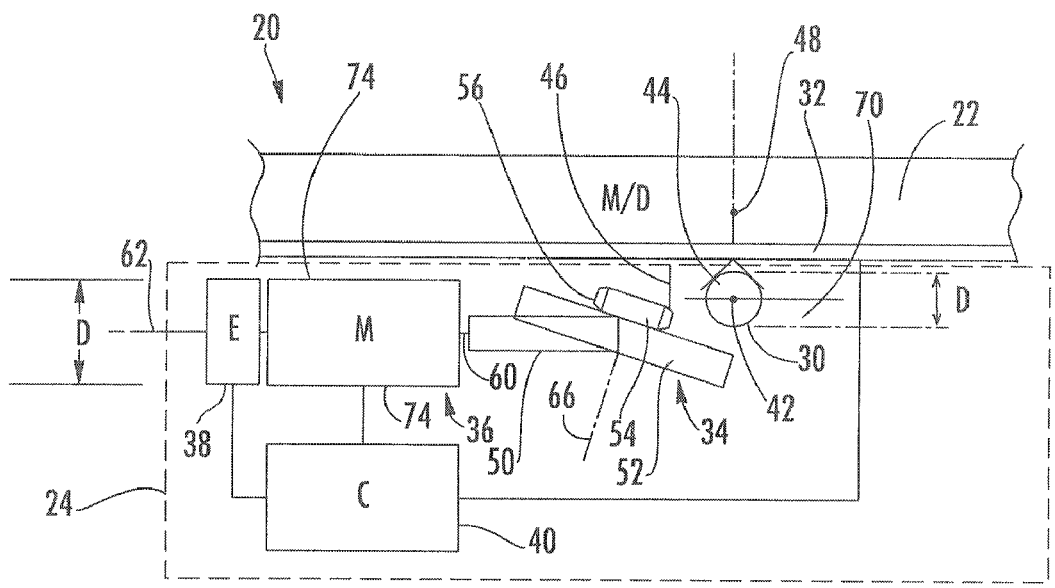
FIG. 1 is a schematic illustration of a media interaction system according to an example embodiment.
Figure 2:
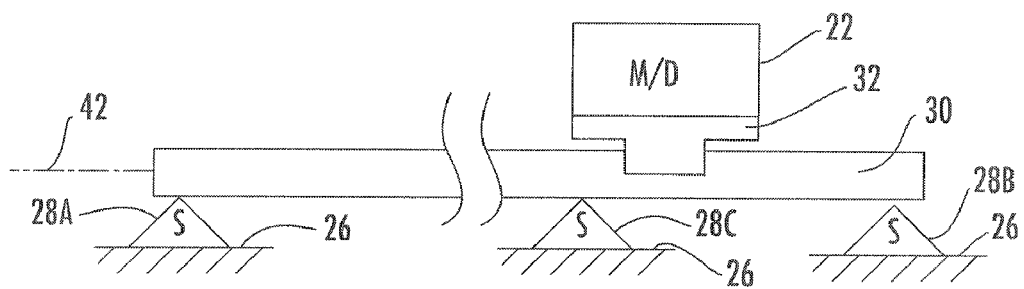
FIG. 2 is a side elevational view schematically illustrating the media interaction system of FIG. 1 with portions omitted for purposes of illustration according to an example embodiment.

FIGS. 1 and 2 schematically illustrate media interaction system 20 according to an example embodiment. Media interaction system 20 is configured to interact with a medium such as by capturing, sensing or scanning information or data on the medium or by depositing or printing printed material onto the medium. As a will described hereafter, media interaction system 20 has a drive system permitting media interaction system 20 to have at least one reduced dimension.

Media interaction system 20 includes media interaction device 22 (schematically shown) and media interaction device drive system 24. Media interaction device 22 comprises a device configured to interact with a medium, such as a sheet of media. According to one embodiment, media interaction device 22 comprises a scanner configured to be movably driven across a dimension of a medium while light reflected off of the medium is sensed and converted to digital signals representing an image or other information on the medium. In one embodiment, media interaction device 22 directs light in an upward direction (as seen in FIG. 1) onto a face of a medium and senses light reflected from the face. In such an embodiment, media interaction device drive system 24 is located substantially below media interaction device 22, wherein media interaction device drive system 24 reduces a height of system 20. In another embodiment, media interaction device 22 may alternatively be configured to direct light in an inclined or horizontal direction onto an inclined or vertical face of a medium while sensing light reflected from the face, wherein media interaction device drive system 24, having the same relative orientation to media interaction device 22, reduces a thickness or width of system 20.

In another embodiment, media interaction device 22 may alternatively comprise one or more print heads configured to deposit printing material onto a surface of a medium. In such an embodiment, media interaction device 22 may eject the printing material in a downward, inclined or horizontal direction. In such an embodiment, media interaction device drive system 24 may alternatively be located above media interaction device 22 or adjacent to media interaction device 22, reducing a height, thickness or width of system 20.

Media interaction device drive system 24 comprises an arrangement of components configured to support and guide media interaction device 22 while moving media interaction device 22. Media interaction device drive system 24 includes housing 26 (shown in FIG. 2), supports 28A, 28B, 28C (collectively referred to as supports 28) (shown in FIG. 2), slider rod 30, carrier 32 (schematically shown), power train 34, motor 36, encoder 38 and controller 40. Housing 26 comprises a frame, body or other structure supporting and at least partially enclosing media interaction system 20. Housing 26 may have a variety of sizes, shapes and configurations.

Supports 28 (schematically shown) comprise structures coupled between housing 26 and slider rod 30 so as to support slider rod 30. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

In the example illustrated, system 20 includes three supports, 28A, 28B and 28C. Supports 28A and 28B comprise outermost supports supporting outermost portions of slider rod 30. Support 28C is located between supports 28A and 28B. Support 28C engages a portion of slider rod 30 opposite to portions of slider rod 30 along which carrier 32 and media interaction device 22 move or slide along. Because support 28C engages only a portion of slider rod 30, permitting carrier 32 to engage a second opposite portion of slider rod 30, support 28C may be located at more of a midpoint of slider rod 30. As a result, support 28C provides enhanced support for slider rod 30, permitting slider rod 30 to have a reduced diameter while also maintaining sufficient strength and rigidity for reliably guiding carrier 32 and media interaction device 22. By permitting a diameter of slider rod 30 to be reduced, support 28C further permits drive system 24 to also have a reduced dimension (height in the example shown in FIG. 1). In other embodiments, supports 28 may have other configurations.

Slider rod 30 comprises an elongate bar, shaft or structure extending along an axis 42 that is configured to guide movement of carrier 32 and media interaction device 22. In one embodiment, rod 30 may additionally be configured to provide at least some support to carrier 32 and media interaction device 22. As noted above, supports 28 reduce forces or moments tending to deflect slider rod 30, permitting slider rod 30 to have reduced diameter or to be formed from less rigid materials. As will be described hereafter, drive system 24 includes other features which also tend to reduce forces experienced by slider rod 30, permitting the diameter of slider rod 30 to be further reduced. Reducing the diameter of slider rod 30 reduces a dimension D of drive system 24. According to one embodiment, such features permit slider rod 30, formed from cold rolled steel that is centerlessly ground and then plated, to have a diameter of less than or equal to about 5 mm. In other embodiments, slider rod 30 may alternatively have a larger diameter or be formed from other materials.

Carrier 32 comprises one or more structures coupled between media interaction device 22, slider rod 30 and power train 34. Carrier 32 is configured to guide movement of media interaction device 22 along the slider rod 30 while transmitting forces from power train 34 to effectuate such movement. In the embodiment illustrated, carrier 32 is configured such that a center of mass of media interaction device 22 (located along line 48) is in close proximity to or substantially coincides with axis 42 of slider rod 30. As a result, carrier 32 and media interaction device 22 impose less twisting, torque or moment upon slider rod 30, further facilitating a reduction in a diameter of slider rod 30 without substantially impairing the ability of slider rod 30 to adequately support and guide carrier 32 and media interaction device 22.

In the example illustrated, carrier 32 includes one or more inverted V-blocks 44 slidably engaging a top outer circle fragile surface of slider rod 30 without completely encircling slider rod 30. As a result, an opposite lower portion of slider rod 30 may be engaged by support 28C as noted above. As schematically shown by FIG. 1, carrier 32 further includes a coupling extension 46 coupled or otherwise joined to power train 34. In other embodiments, carrier 32 may be slidably coupled to slider rod 30 and connected to power train 34 in other manners.

Power train 34 comprises a drive train or transmission including one or more motion transmitting elements configured to receive torque from motor 36 and to transmit such torque, while converting such torque so as to linearly move carrier 32 and media interaction device 22 along an axis 42 of slider rod 30. As shown by FIG. 1, power train 34 and slider rod 30 at least partially nest with respect to one another to reduce dimension D (shown as a height in FIG. 1) of drive system 24. Power train 34 is further arranged to reduce forces upon slider rod 30, further permitting a diameter of slider rod 30 to be reduced. Power train 34 includes rotational element 50, rotational element 52, rotation element 54 and linear element 56. Rotational element 50 is coupled to output shaft 60 of motor 36 and receives torque from motor 36. Element 50 rotates about axis 62.

Element 54 is rotatably supported about axis 66 and receives torque from element 50. Element 52 transmits such torque to element 54. Element 54 also rotates about axis 66 and transmits torque to linear element 56. As shown by FIG. 1, element 52 extends below that least portions of slider rod 30 such that slider rod 30 is at least partially nested above element 52. At the same time, portions of element 52 extend above a lower outer circumferential surface of slider rod 30. Because element 52 is tilted and rotates about axis 66 which is oblique to axis 42, element 54 may be positioned in closer proximity to axis 42, permitting linear element 56 to also be positioned in closer proximity to slider rod 30. For example, element 54 may be located such that linear element 56 is supported horizontally across from axis 42. In one embodiment, linear element 56 and axis 42 are intersected by a common horizontal plane 70. Because linear element 56 may be positioned in closer proximity to axis 42 of slider rod 30, less moment is imparted to slider rod 30, permitting a diameter of slider rod 30 to be reduced or slider rod 30 to be formed from less rigid and generally less expensive materials.

Linear element 56 is coupled between element 54 and carrier 32. Linear element 56 is coupled to element 54 such that rotational element 54 linearly moves element 56 in directions parallel to axis 42. Because linear element 56 is connected to carrier 32 by extension 46, such linear movement also results in linear movement of carrier 32 and media interaction device 22 along axis 42.

In one embodiment, linear element 56 comprises an endless member such as a belt or chain encircling element 54 at one end while also encircling another idling roller, pulley or sprocket at another end. In yet another embodiment, element 56 may comprise an elongate strap, band, set of links or chain having a first end secured to element 54 and having a second end secured to an idling roller, pulley or sprocket, wherein element 56 winds and unwinds from element 54 depending upon the direction in which elements 54 and 52 are rotated about axis 66.

According to one embodiment, element 50 comprises a worm gear while elements 52 and 54 comprise spur gears. In one embodiment, elements 52 and 54 comprise a cluster gear. In one embodiment, the worm gear comprising element 52 has a lead angle and elements 54 and 56 are tilted along an axis 66 at the substantially same lead angle. As a result, element 54 may comprise a spur gear or a straight pull gear rather than a helical gear, reducing its cost and providing an enhanced accuracy. In addition, gear efficiency may also be enhanced. In other embodiments, other rotatable elements, such as pulleys or sprocket's and associated belts or chains may be employed.

Motor 36 comprises a motor configured to deliver torque in response to control signals received from controller 40. In one embodiment, motor 36 comprises a DC motor. In one embodiment, motor 36 has a pair of opposite flattened or substantially flat sides 74. In one embodiment, such flat sides 74 are facilitated by motor 36 being configured with just two stationary magnets angularly spaced 180 degrees from one another about an armature, wherein sides 74 are formed between the opposing magnets. As a result, motor 36 may have a reduced height, reducing dimension D of drive system 24. In one embodiment, motor 36 has a 24 mm flat can size, wherein the distance between flat sides 74 is approximately 18.3 mm. In other embodiments, motor 36 may have other dimensions and may omit such flat sides 74.

Encoder 38 comprises a device configured to sense the direction and rotational displacement of output shaft 60 of motor 36. In one embodiment, encoder 38 includes an encoder disc or wheel having a diameter less than a maximum dimension of motor 36. For example, in one embodiment, encoder 38 may have a wheel (not shown) having a diameter less than the distance between flat sides 74. Consequently, encoder 38 does not increase the dimension D of drive system 24 or minimally increases the dimension D of drive system 24.

Controller 40 comprises one or more processing units configured to generate control signals directing operation of motor 36 and media interaction device 22. In one embodiment, controller 40 may be additionally configured to manipulate or analyze data, in the form of signals, received from encoder 38, in the process of generating such control signals. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 40 may be embodied as part of one or more application-specific integrated circuits (ASICs). Unless otherwise specifically noted, the controller is not limited to any specific combination of hardware circuitry and software, nor to any particular source for the instructions executed by the processing unit.

In operation, in response to receiving a command requesting interaction with a medium, such as a scan or print request, controller 40 generates control signals directing motor 36 to supply torque to power train 34. Power train 34 transmits the torque so as to drive linear element 56 which causes correspondingly linear movement of carrier 32 and media interaction device 22. During such movement of media interaction device 22 or after such movements or steps, controller 40 further generates control signals directing the operation of media interaction device 22.

For example, controller 40 may direct media interaction device 22 to emit light and sense light reflected light off of a medium. In another embodiment, controller 40 may direct media interaction device 22 to eject printing material upon a medium. Because slider rod 30 reliably guides movement of media interaction device 22, such scanning or printing performance is enhanced. At the same time, system 20 has a reduced dimension and is more compact.

Figure 3:
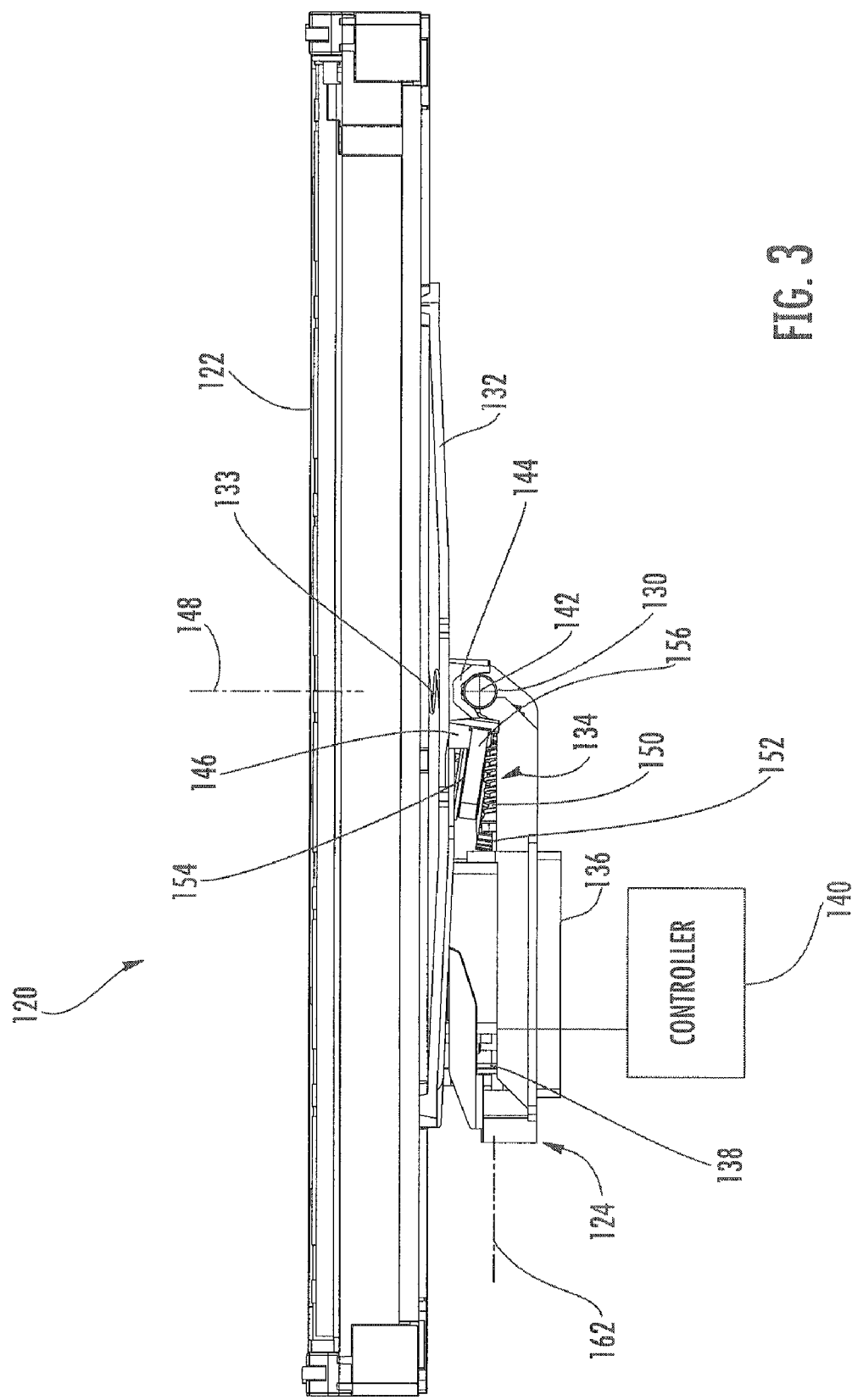
FIG. 3 is an end view of another embodiment of the media interaction system of FIG. 1 according to an example embodiment.

FIGS. 3-7 illustrates media interaction system 120, a particular embodiment of media interaction system 20. In the particular example illustrated, media interaction system 120 is configured to scan and capture data or images upon a surface of a medium. Like system 20, system 120 has a reduced dimension (height as seen in FIG. 3) while maintaining performance. For example, system 120 is less susceptible to scan artifacts. In the particular embodiments illustrated, media interaction device drive system 124 has a dimension D (shown in FIG. 7) of less than or equal to about 20 mm.

Figure 4:
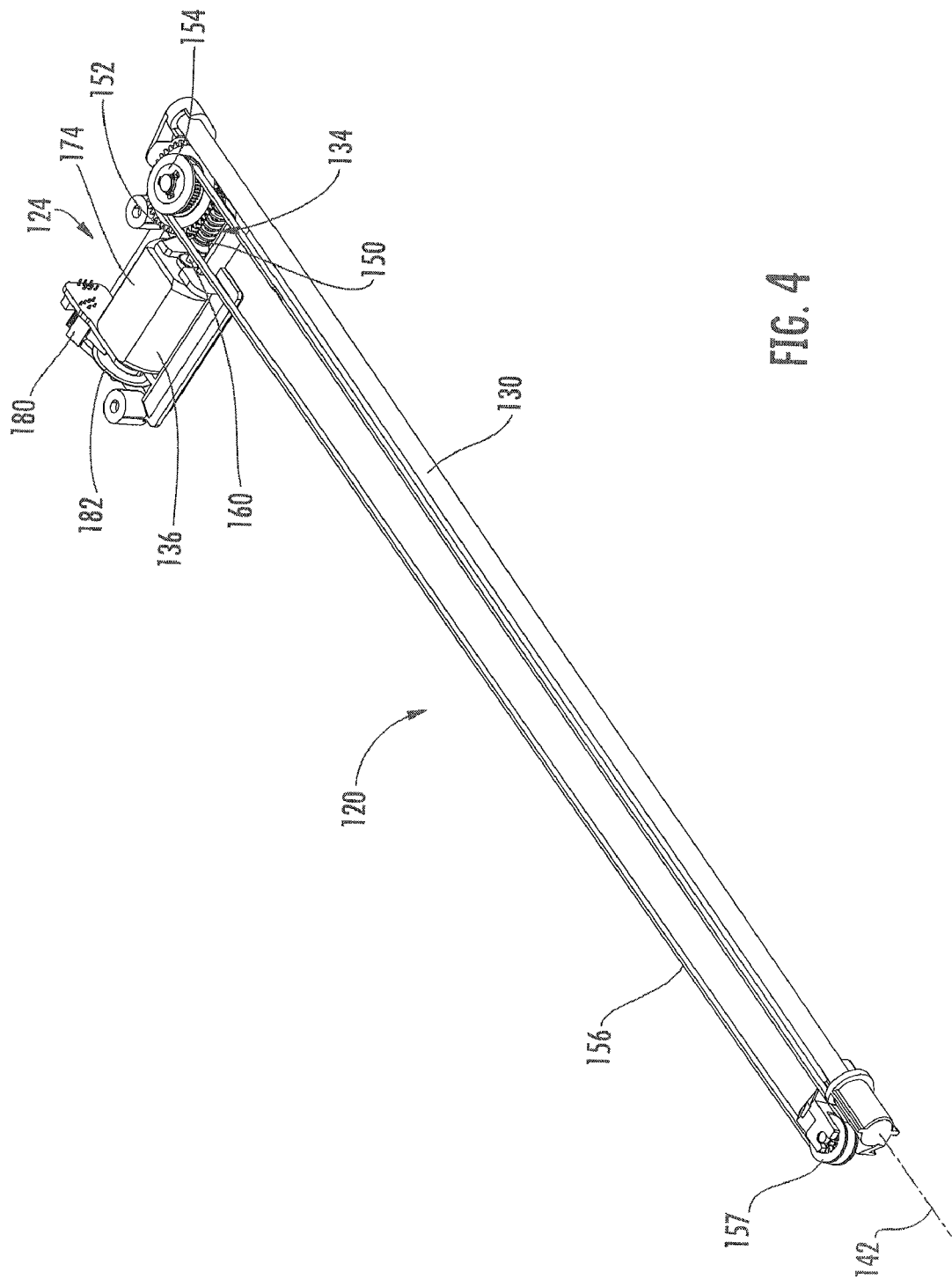
FIG. 4 is a perspective view of a media interaction device drive system of the media interaction system of FIG. 3 according to an example embodiment.

As shown by FIGS. 3 and 4, system 120 includes media interaction device 122 and media interaction device drive system 124. In the embodiment shown, media interaction device 122 comprises a scanner configured to be movably driven across a dimension of a medium while light reflected off of the medium is sensed and converted to digital signals representing an image or other information on the medium. In one embodiment, media interaction device 122 directs light in an upward direction (as seen in FIG. 3) onto a face of a medium and senses of light reflected from the face. In such an embodiment, media interaction device drive system 124 is located substantially below media interaction device 122, wherein media interaction device drive system 124 reduces a height of system 120. In another embodiment, media interaction device 122 may alternatively be configured to direct light in an inclined or horizontal direction onto an inclined or vertical face of a medium while sensing light reflected from the face, wherein media interaction device drive system 24 reduces a thickness or width of system 120. In other embodiments, media interaction device 122 may comprise one or more print heads.

Media interaction device drive system 124 comprises an arrangement of components configured to support and guide media interaction device 122 while moving media interaction device 122. Media interaction device drive system 24 includes housing 26 (shown in FIG. 2), supports 28A, 28B, 28C (collectively referred to as supports 28) (shown in FIG. 2), slider rod 130, carrier 132, bias 133, power train 134, motor 136, encoder 138 and controller 140 (shown in FIG. 3). As discussed above with respect to FIG. 2, housing 26 comprises a frame, body or other structure supporting and at least partially enclosing media interaction system 120. Housing 26 may have a variety of sizes, shapes and configurations.

Supports 28 of system 120 are substantially similar to supports 28 of system 20 except that supports 28 in system 120 support slider rod 130 instead of slider rod 30. Like in system 20 in FIG. 2, support 28C provides enhanced support for slider rod 130, permitting slider rod 130 to have a reduced diameter while also maintaining sufficient strength and rigidity for reliably guiding carrier 132 and media interaction device 122. By permitting a diameter of slider rod 130 to be reduced, support 28C further permits drive system 124 to also have a reduced dimension (height in the example shown in FIG. 3). In other embodiments, supports 28 may have other configurations.

Slider rod 130 comprises an elongate bar, shaft or structure extending along an axis 142 that is configured to guide movement of carrier 132 and media interaction device 122. In one embodiment, rod 130 may additionally be configured to provide at least some support to carrier 132 and media interaction device 122. As noted above, supports 28 reduce forces tending to deflect slider rod 130, permitting slider rod 130 to have reduced diameter or to be formed from less rigid materials. As will be described hereafter, drive system 24 of system 20, drive system 124 includes other features which also tend to reduce forces experienced by slider rod 130, permitting a diameter of slider rod 130 to be further reduced. Reducing a diameter of slider rod 130 reduces a dimension D (shown in FIG. 7) of drive system 124. According to one embodiment, such features permit slider rod 130, formed from cold rolled steel that is centerlessly ground and then plated to have a diameter of less than or equal to about 5 mm. In other embodiments, slider rod 130 may alternatively have a larger diameter or be formed from other materials.

Carrier 132 comprises one or more structures coupled between media interaction device 122, slider rod 130 and power train 134. Carrier 132 is configured to guide movement of media interaction device 122 along the slider rod 130 while transmitting forces from power train 134 to effectuate such movement. In the embodiment illustrated, carrier 132 is configured such that a center of mass of media interaction device 122 (located along line 148 is in close proximity to or substantially coincides with axis 142 of slider rod 130. As a result, carrier 132 and media interaction device 122 impart less twisting or torque upon slider rod 130, further facilitating a reduction in a diameter of slider rod 130 without substantially impairing the ability of slider rod 130 to adequately support and guide carrier 132 and media interaction device 122.

As shown by FIG. 3, carrier 132 includes one or more inverted V-blocks 144 slidably engaging a top outer circumferential surface of slider rod 130 without completely encircling slider rod 130. As a result, an opposite lower portion of slider rod 130 may be engaged by support 28C as noted above. As further shown by FIG. 3, carrier 32 further includes a coupling extension 146 coupled or otherwise joined to power train 134. In other embodiments, carrier 132 may be slidably coupled to slider rod 130 and connected to power train 134 in other manners.

Bias 133 comprises one or more resilient members captured or sandwiched between carrier 132 and media interaction device 122. Bias 133 resiliently urges or biases media interaction device 122 in a direction away from carrier 132. In the particular example illustrated in which media interaction device 122 comprises a scanner, bias 133 resiliently urges scanner 120 against or towards a transparent platen (not shown) upon which a medium to be scanned rests. In the particular example illustrated, bias 133 comprises one or more compression springs. In other embodiments, other resiliently compressible members may be employed.

Power train 134 comprises a drive train or transmission including one or more motion transmitting elements configured to receive torque from motor 136 and to transmit such torque while converting such torque so as to linearly move carrier 132 and media interaction device 122 along an axis 142 of slider rod 130. As shown by FIG. 7, power train 134 and slider rod 130 at least partially nest with respect to one another to reduce dimension D (shown as a height in FIG. 7) of drive system 124. Power train 134 is further arranged to reduce forces upon slider rod 130, further permitting a diameter slider rod 130 to be reduced. Power train 34 includes rotational element 150, rotational element 152, rotation element 154 and linear element 156. Rotational element 150 is coupled to output shaft 160 of motor 136 and receive torque from motor 136. Element 150 rotates about axis 162.

Element 154 is rotationally supported about axis 166 and receives torque from element 150. Element 152 transmits such torque to element 154. Element 154 also rotates about axis 166 and transmits torque to linear element 156. As shown by FIG. 7, element 152 extends below that least portions of slider rod 130 such that slider rod 130 is at least partially nested above element 152. At the same time, portions of element 152 extend above a lower outer circumferential surface of slider rod 130. Because element 152 is tilted and rotates about axis 166 which is oblique to axis 142, element 154 may be positioned in closer proximity to axis 142, permitting linear element 156 to also be positioned in closer proximity to slider rod 130. For example, element 154 may be located such that linear element 156 is supported horizontally across from axis 142. In one embodiment, both linear element 56 and axis 42 are intersected by a common substantially horizontal plane 170. Because linear element 156 may be positioned in closer proximity to axis 142 of slider rod 130, less moment is imparted to slider rod 130, permitting a diameter of slider rod 130 to be reduced or slider rod 130 to be formed from less rigid and generally less expensive materials.

Linear element 156 is coupled between element 154 and carrier 132. Linear element 156 is coupled to element 154 such that rotational element 154 linearly moves element 156 in directions parallel to axis 142. Because linear element 156 is connected to carrier 132 by extension 146, such linear movement also results in linear movement of carrier 132 and media interaction device 122 along axis 42.

In the example embodiment illustrated, linear element 156 comprises an endless member such as a belt encircling element 154 at one end while also encircling another idling pulley 157 at another end. In other embodiments, linear element or 156 may comprise an endless member such as a chain. In yet another embodiment, element 156 may comprise an elongate strap, band, chain or set of interconnected links having a first end secured to element 154 and having a second end secured to an idling roller, pulley or sprocket, wherein element 156 winds and unwinds from element 154 depending upon the direction in which elements 154 and 152 are rotated about axis 166.

In the embodiment illustrated, element 150 comprises a worm gear while elements 152 and 154 comprise spur gears. In one embodiment, elements 152 and 154 comprise a cluster gear. In one embodiment, the worm gear comprising element 152 has a lead angle and elements 154 and 156 are tilted along an axis 160 at the substantially the same lead angle. As a result, element 154 may comprise a spur gear or a straight pull gear rather than a helical gear, reducing its cost and providing an enhanced accuracy. In addition, gear efficiency may also be enhanced. In one embodiment, the worm gear of element 150 has a lead angle nominally set at 8.5 degrees with respect to vertical. Likewise, elements 152 and 154 are tilted at an angle with respect to vertical of about 8.5 degrees with respect to vertical. In other embodiments, elements 152 and 154 may be tilted at other angles. In other embodiments, other rotational elements, other than gears, such as pulleys or sprockets and associated belts or chains, respectively, may be employed.

Motor 136 comprises a motor configured to deliver torque in response to control signals received from controller 40. In one embodiment, motor 136 comprises a DC motor. In the embodiment illustrated, motor 36 has a pair of opposite planar or flat sides 174. In one embodiment, such flat sides 174 are facilitated by motor 136 being configured with just two stationary magnets (not shown) angularly spaced 180 degrees from one another about an armature, wherein sides 174 are formed between the opposing magnets. As a result, motor 136 may have a reduced height, reducing dimension D of drive system 124 as seen in FIG. 7. In one embodiment, motor 136 has a 24 mm flat can size, wherein the distance between flat sides 174 is approximately 18.3 mm. In other embodiments, motor 136 may have other dimensions and may omit such flat sides 174.

Encoder 138 comprises a device configured to sense the direction and rotational displacement of output shaft 160 of motor 36. As shown in FIG. 5, encoder 138 includes a sensing portion 180 and an encoder disc or wheel 182. Neither sensing portion 180 nor wheel 182 has a diameter or dimension greater than a maximum dimension of motor 136. For example, in one embodiment, encoder 138 has a dimension so as to not extend above or below flat sides 74. Consequently, encoder 138 does not increase the dimension D of drive system 124.

Controller 140 is substantially similar to controller 40 shown and described above with respect to system 20. Like controller 40, controller 140 comprises one or more processing units configure to generate control signals directing operation of motor 136 and media interaction device 122. In one embodiment, controller 140 may be additionally configured to manipulate or analyze data, in the form of signals, received from encoder 138 in the process of generating such control signals. In operation, in response to receiving a command requesting interaction with a medium, controller 140 generates control signals directing motor 136 to supply torque to power train 134. Power train 134 transmits the torque so as to drive linear element 156 which causes correspondingly linear movement of carriage 132 and media interaction device 122. During such movement of media interaction device 122 or after such individual movements, controller 140 further generates control signals directing the operation of media interaction device 122.

In summary, drive systems 24, 124 of systems 20 and 120, respectively, maintain or enhance performance of media interaction devices 22, 122 while potentially reducing at least one dimension of such drive systems. At least one dimension is reduced by configuring systems 24 and 124 to utilize a motor 36, 136 having flat sides, by using an encoder 38, 138 which does not exceed the maximum dimension of the motor, by nesting the power train 34, 134 with respect to a slider rod 30, 130 and by reducing a diameter of the slider rod 30, 130. The diameter of the slider rod 30, 130 is reduced without substantially sacrificing reliable guidance of the media interaction device 22, 122 because carriers 32 and 132 are configured to permit slider rod 30, 130 to be supported at an intermediate point by support 28C, because gear 32 supports media interaction device 22, 122 with a center of mass in close proximity to the axis of the slider rod 30, 130 and because power train 34, 134 is nested with respect to slider rod 30, 132 to lessen forces or moments imparted upon slider rod 30, 130. In the particular embodiments illustrated in which element 50, 150 comprises a worm gear having a lead angle while element 52, 152 is tilted at the same lead angle, element 54, 154 may comprise a spur gear or a straight pull gear rather than a helical gear, reducing its cost and providing an enhanced accuracy. In addition, gear efficiency may be enhanced.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a media interaction device; and
   a media interaction device drive system comprising:
   a motor having an output shaft extending along a first axis; and
   a power train operably coupled between the output shaft and the media interaction device to move the device, wherein the power train includes an element rotational about a second axis oblique to the first axis.

2. The apparatus of claim 1, wherein the element comprises a gear.

3. The apparatus of claim 2, wherein the gear includes straight teeth extending parallel to the second axis.

4. The apparatus of claim 1, wherein the device is movable along a rod and wherein the element extends below the rod opposite the device.

5. The apparatus of claim 1, wherein the power train further comprises a belt operably coupled between the device and the element.

6. The apparatus of claim 1 further comprising a worm gear connected to the output shaft along the first axis and in engagement with the element.

7. The apparatus of claim 6, wherein the worm gear has a lead angle and wherein the element comprises a spur gear tilted at substantially the lead angle.

8. The apparatus of claim 7, wherein the power train includes a belt coupled to the device and wherein the spur gear comprises a cluster gear having a first portion in engagement with the worm gear and a second portion in engagement with the belt.

9. The apparatus of claim 8 further comprising a rod along which the media interaction device moves, wherein the second portion engages the belt horizontally opposite a center line of the rod.

10. The apparatus of claim 1, wherein the device is movable along a third axis and wherein the first axis and the third axis extend in parallel or coextensive planes.

11. The apparatus of claim 1, wherein the motor has a first end from which the output shaft extends, a second end opposite the first end and a substantially flat outer side between the first end and the second end.

12. The apparatus of claim 1 further comprising an encoder disc coupled to the output shaft, wherein the encoder disc is recessed below a top of the motor.

13. The apparatus of claim 1 further comprising:
   a rod having an axially extending portion along which the device moves; and
   a support supporting the rod at a point along the axially extending portion.

14. The apparatus of claim 1, wherein the device is movable along a third axis substantially perpendicular to the first axis.

15. The apparatus of claim 1, wherein the media interaction device comprises a scanner.

16. The apparatus of claim 1, wherein the drive system has a height of less than or equal to about 20 mm.

17. A method comprising:
   driving a motor output shaft about a first axis; and
   transmitting torque from the output shaft to a power train having an element rotational about a second axis oblique to the first axis to move a media interaction device.

18. The method of claim 17, wherein the media interaction device is a scanner.

19. The method of claim 17, wherein the device is movable along a rod and wherein the element extends below the rod opposite the scanner.

20. An apparatus comprising:
   means for interacting with a medium;
   a motor having output shaft extending along a first axis; and
   means for moving the means for interacting along an axis, the means including at least one of (1) a rotational element oblique to the axis; (2) a slider rod supported at a first end, a second end and an intermediate location while being located in substantial alignment with a center of mass of the means for interacting; or (3) a substantially flat sided motor and an associated encoder disc having a diameter less than a distance across a flat side of the motor.

* * * * *